April 21, 1970    JOY T. PETERSEN    3,507,312
NOW BY CHANGE OF NAME JOY THORPE HIBBERT
FABRIC DISH AND PAN HOLDER
Filed Dec. 18, 1967
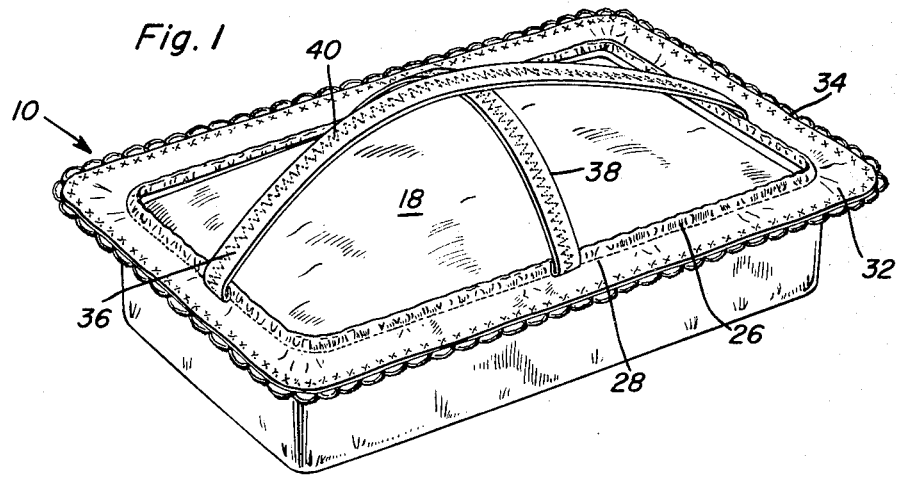
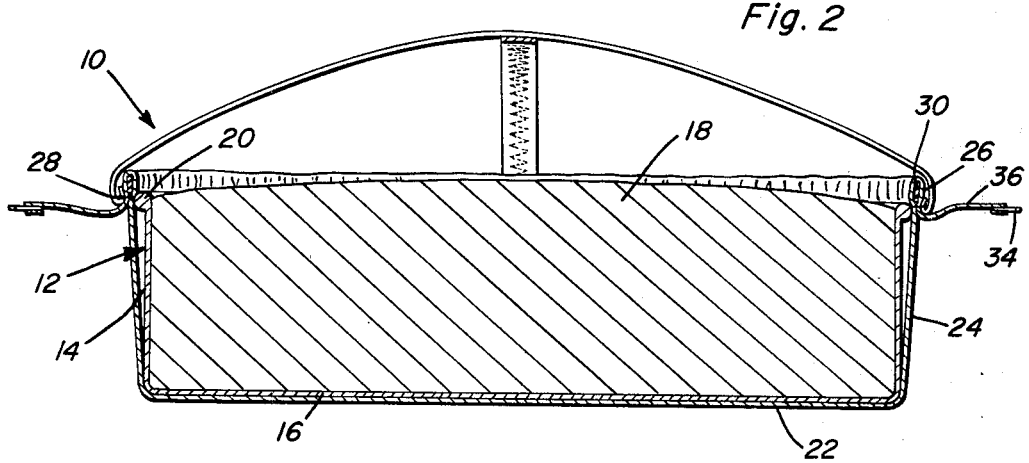
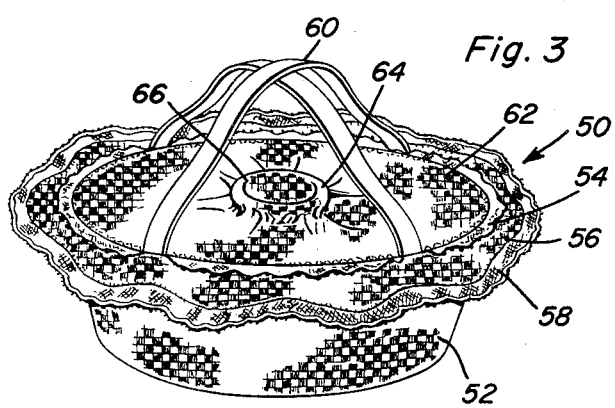
JOY T. HIBBERT
INVENTOR.
BY *Clarence A. O'Brien*
and *Harvey B. Jackson*
Attorneys United States Patent Office 3,507,312
Patented Apr. 21, 1970

3,507,312
FABRIC DISH AND PAN HOLDER
Joy T. Petersen, Broomfield, Colo. (471 East 1800 South, Orem, Utah 84057), now by change of name Joy Thorpe Hibbert
Filed Dec. 18, 1967, Ser. No. 691,375
Int. Cl. A45c 5/10; B65d 37/00
U.S. Cl. 150—48        6 Claims

ABSTRACT OF THE DISCLOSURE

A cover and holder constructed of fabric material in the shape and configuration of a container for receiving a dish or pan therein. The peripheral rim of the fabric holder is provided with an elastic band retaining the holder on the dish or pan and flexible straps are connected to the peripheral rim of the holder to provide a carrying handle for the holder and dish or pan associated therewith. The fabric holder is not only functional for enabling a dish or pan which may have a hot food product therein to be easily carried without possible injury to the fingers but is also highly decorative especially to conceal the dish or pan when the food product is being served directly therefrom at the table or the like.

---

The present invention generally relates to a fabric type dish or pan holder constructed generally in the shape and configuration of a dish or pan for receiving the same and including a handle structure for carrying the dish or pan. The fabric holder is provided with a resilient band around the periphery thereof to retain the holder associated with the dish or pan and the handle structure is in the form of crossed flexible straps to provide a stable carrying handle for the holder. In addition, the fabric dish and pan holder is decorative and may be constructed of various fabric materials of various shapes and configurations to provide not only a functional but decorative dish and pan holder.

Therefore, it is an object of the present invention to provide a fabric dish and pan holder which is simple in construction, easy to use, easy to launder, effective for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the dish and pan holder of the present invention associated with a dish or pan;

FIGURE 2 is a longitudinal, sectional view along the center line of the construction of FIGURE 1; and FIGURE 3 is a perspective view of another embodiment of fabric dish and pan holder.

Referring now specifically to the drawings, the numeral 10 generally designates the fabric dish and pan holder of the present invention associated with a container such as a dish or pan 12 including a peripheral upstanding wall 14 and a bottom wall 16 and containing a food product 18 such as a cake or other baked goods, casserole dishes or the like with the food product 18 normally being served directly from the dish or pan. As illustrated, the upstanding wall 14 is provided with a peripheral rim 20 which is conventionally provided on dishes or pans which are normally referred to as baking dishes or baking pans. It is understood that the dish or pan 12 may be rectangular, square, circular or any other suitable configuration or shape with the fabric holder 10 corresponding in the shape and configuration of the dish or pan on which it is to be mounted.

The fabric dish and pan holder 10 includes a bottom panel 22 and an upwardly extending peripheral wall panel 24 having a hem 26 formed at the upper edge thereof by stitching 28 with the hem 26 being disposed generally alongside of but slightly above the peripheral rim 20 on the pan or dish 12. A resilient band or strap 30 is disposed within the hem 26 and retains the hem 26 snugly engaged with the rim 20 of the dish or pan 12. Projecting outwardly as a free edge of the wall 24 which is reversely folded to form the hem 26, there is formed a panel 32 which may be considered in the form of a ruffle with decorative edging 34 stitched to the periphery thereof.

A pair of lifting and carrying straps 36 and 38 are disposed in crossed relation with the ends thereof attached to the opposite sides of the holder 10. For example, the straps 36 and 38 are secured to the outer surface of the hem 26 by the stitching 28 which also defines the hem. The straps 36 and 38 are of fabric material and are preferably of a double thickness and provided with decorative stitching 40 or the like along the outer surface thereof. As illustrated in FIG. 1, the hem 26 is gathered by the elastic strap 30 to substantially conceal the dish or pan 12 and the handle straps 36 and 38 provide a stable carrying handle for the holder by grasping the intersecting portions thereof. In addition, the narrow structure of the straps 36 and 38 enable the food product such as cakes, casserole dishes or the like to be served directly from the dish or pan without interference from the handle structure.

FIGURE 3 illustrates another embodiment of the holder generally designated by the numeral 50 including a cylindrical peripheral wall 52 with a hem 54 at the upper edge thereof and an outwardly extending flange 56 provided with decorative edging 58. Crossed handle straps 60 are provided and are attached to the hem 54. In this construction, a cover 62 is also provided for a lid for the container with the cover 62 including a resilient band disposed within a hem 64 adjacent the center of the cover 62 to form an upwardly extending projection 66 which snugly engages the handle for the dish cover. This construction is especially useful with dishes in which the dish is provided with a glass cover or the like having a knob-like handle at the center thereof. The straps 60 may be oriented in an out-of-the-way position, that is inverted in relation to the position illustrated in FIG. 3 so that the decorative fabric cover and the glass dish cover may be removed by grasping the central upwardly extending knob covered by the projection 66 in a conventional manner.

It is pointed out that the specific configuration of the fabric holder is variable as are the dimensional characteristics thereof. Moreover, the fabric holders may be constructed of various decorative materials compatible with the decor of the area in which it is to be used.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A holder for a receptacle in the form of a dish, pan or the like having a bottom and upstanding peripheral wall comprising a fabric member including a bottom panel and an upstanding peripheral wall conforming with and supportingly engaging the botom and peripheral fall of the receptacle, means at the upper end of the peripheral wall of the fabric member retaining it engaged with the upper end portion of the upstanding wall of the receptacle, and handle forming means attached to the upper end of the peripheral wall of the fabric member for enabling the fabric member and receptacle disposed therein to be carried and easily handled, said upstanding wall on the fabric member including an outwardly extending peripheral ruffle having a decorative edging thereon to enhance the appearance of the receptacle.

2. The structure defined in claim 1 wherein said means at the uper end of the wall of the fabric member includes a peripheral hem, and an elastic insert in said hem for snugly engaging the periphery of the receptacle.

3. The structure as defined in claim 1 wherein said handle forming means includes a pair of crossed flexible straps having terminal ends attached to the exterior of the upper end of the peripheral wall of the fabric member.

4. A holder for a receptacle in the form of a dish, pan or the like having a bottom and upstanding peripheral wall comprising a fabric member including a bottom panel and an upstanding peripheral wall conforming with and supportingly engaging the botom and peripheral wall of the receptacle, means at the upper end of the peripheral wall of the fabric member retaining it engaged with the upper end portion of the upstanding wall of the receptacle, and handle forming means attached to the upper end of the peripheral wall of the fabric member for enabling the fabric member and receptacle disposed therein to be carried and easily handled, a cover for the receptacle, said receptacle cover including an upstanding handle, and a fabric cover for the receptacle cover including a centrally disposed socket defined by a hem with a resilient insert therein for grippingly engaging the handle on the receptacle cover.

5. The structure as defined in claim 4 wherein said upstanding wall on the fabric member includes an outwardly extending peripheral ruffle having a decorative edging thereon to enhance the appearance of the receptacle.

6. The structure as defined in claim 4 wherein said means at the upper end of the wall of the fabric member retaining it engaged with the upper end portion of the upstanding wall of the receptacle includes a peripheral hem, and an elastic insert in said hem for snugly engaging the periphery of the receptacle.

References Cited

UNITED STATES PATENTS

| | | | |
|---|---|---|---|
| 110,340 | 12/1870 | Carter | 150—48 |
| 2,035,384 | 3/1936 | Hinchliff | 150—52 |
| 2,302,259 | 11/1942 | Rothfuss | 150—52 |
| 2,464,069 | 3/1949 | Benson | 150—50 X |
| 2,610,757 | 9/1952 | Irvine | 150—52 X |
| 2,778,398 | 1/1957 | Edwards | 150—52 |
| 2,954,891 | 10/1960 | Imber | 150—52 X |
| 3,180,385 | 4/1965 | Kuroda | 150—48 |

DONALD F. NORTON, Primary Examiner

U.S. Cl. X.R.

150—52; 215—12; 220—63; 224—45